United States Patent Office 3,707,465
Patented Dec. 26, 1972

3,707,465
CLARIFICATION OF AQUEOUS SUSPENSIONS WITH OXYAMINATED POLYACRYLAMIDE FLOCCULATING AGENTS
Elmar Reinwald, Dusseldorf-Wersten, and Joachim Galinke, Dusseldorf-Holthausen, Germany, assignors to Henkel & Cie GmbH, Dusseldorf-Holthausen, Germany
No Drawing. Filed Apr. 21, 1971, Ser. No. 136,206
Claims priority, application Germany, Oct. 31, 1970, P 20 53 675.8
Int. Cl. B01d 21/01
U.S. Cl. 210—52                    10 Claims

ABSTRACT OF THE DISCLOSURE

A process of clarification of aqueous suspensions consisting of contacting an aqueous suspension with an oxyaminated polyacrylamide in order to form a floc and separating clarified water from said floc.

THE PRIOR ART

In the clarification of aqueous suspensions, it has been known to improve the speed of sedimentation of filtration of aqueous suspensions by the addition of flocculation or filtration aids which are based on natural products, such as starch. In addition, synthetic high polymers, such as polyacrylamides, have also been used as effective flocculating or filtration aids, particularly for the clarification of aqueous suspensions as they are obtained in the paper industry. The advantage of polyacrylamide lies in a higher effectiveness and particularly in the uniform quality. A certain disadvantage of polyacrylamides is, however, the extension dependence upon the pH of the suspension in order to effect good flocculation.

OBJECTS OF THE INVENTION

An object of the invention is the use of oxyaminoated polyacrylamides as flocculating agent for aqueous suspensions as they are obtained particularly in the paper industry.

Another object of the invention is the development of a process of clarification of aqueous suspensions consisting of contacting an aqueous suspension with an oxyaminated polyacrylamide in order to form a floc and separating clarified water from said floc.

These and other objects of the present invention will become more apparent as the description thereof proceeds.

DESCRIPTION OF THE INVENTION

Surprisingly, it has now been found that the pH-dependence can be widely reduced, if oxyaminated polyacrylamide and oxyamination agent slight amounts of an suspensions. With a particular advantage the oxyaminated polyacrylamides can be used as flocculating agents for the aqueous and preferably acidic suspensions which are obtained in the paper industry.

Polyacrylamides are utilized as a starting material for the preparation of the oxyaminated polyacrylamides. Preferably a polyacrylamide polymerized in a redox system is used. Suitable polyacrylamides have, for example, average molecular weights of between 2 and 10 million.

The oxyamination of polyacrylamide may be carried out similar to the known process for oxyalkylation. It has been proven advantageous to add to the mixture of polyacrylamide and oxyamination agent slight amounts of an alkaline catalyst such as an alkaline oxyalkylation catalyst. It has been found sufficient if catalytic amounts of about 0.1% to 2%, based on the polyacrylamide of sodium hydroxide or potassium hydroxide are added. Optionally it may be appropriate to add to this reaction, proceeding in an aqueous phase, also smaller amounts of water-miscible solvents as dissolving intermediaries for the oxyamination agent. Here, for instance, dioxane, methanol, ethanol, acetone and the like are of interest. The oxyamination is suitably carried out at slightly raised temperatures, between about 40° to 100° C. and requires about 15 minutes to 4 hours.

The amines of ammonium compounds suitable for the oxyamination correspond to the following structure:

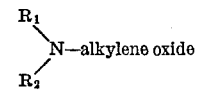

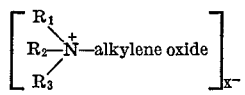

wherein $R_1$ and $R_2$ represent a lower alkyl radical having 1 to 8 carbon atoms or a cycloalkyl radical having 5 to 8 carbon atoms or hydrogen. The radical "alkylene oxide" means a lower alkylene radical having 3 to 6 carbon atoms which contains the epoxy group, preferably in the terminal position. As alkylene oxide radicals are, for example, of interest the propylene- or butylene oxide- or also hexylene oxide-radical. As a cycloalkyl radical, first of all the cyclohexylene radical is considered.

If quaternary ammonium compounds are used for oxyamination, "alkylene oxide" means in this case the same as described above, $R_1$, $R_2$ and $R_3$ are the same or different alkyl or cycloalkyl radicals having 1 to 8, or 5 to 8, carbon atoms, respectively, and $x^-$ is a negative radical.

Preferably the oxyamination agent is a compound of the formulae:

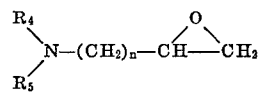

and

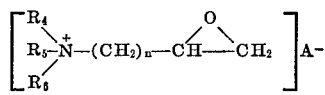

wherein $R_4$, $R_5$ and $R_6$ are alkyl having from 1 to 8 carbon atoms; $n$ is an integer from 1 to 4 and A represents a member selected from the group consisting of hydroxyl and the acyl of a strong mineral acid, such as the chloride, sulfate and nitrate.

In order to prepare oxyaminated polyacrylamides, to be used according to the invention, suitable polyacrylamide is reacted with 0.2 to 20, particularly 0.5 to 2.5, mol percent of an amine or quaternary ammonium compound containing epoxide groups, the amount being based on an acrylamide unit in the polyacrylamide molecule. Preferably for the preparation of the oxyaminated polyacrylamides, derivatives of 1 - di - loweralkylamino - 2,3-epoxypropane or 1-tri-lower-alkylammonium-2,3-epoxypropane chloride are used.

The amounts of addition of the flocculating agents may vary widely upon the suspension to be flocculated and are generally between 0.02 and 2 gm., based on 100 gm. of the solids. The flocculating agent may be added as solids or advantageously in an aqueous solution.

The invention, therefore, involves a process of clarification of aqueous suspensions consisting of contacting an aqueous suspension with an oxyaminated polyacrylamide in order to form a floc and separating clarified water from said floc.

The flocculating agents, to be used according to the invention, show good stability in their aqueous solutions and may be used directly, without isolation. Often a good flocculation effect is observed already at an addition of less than 1%, based on the solids, also in the acidic range.

The oxyaminated polyacrylamides to be used in the clarification of aqueous suspensions, according to the invention, are suitable in many technical fields for the flocculating of precipitates from aqueous suspensions. They may be used, for instance, in the clarification of sugar solutions, in the processing of water in ore or coal mining in order that the clarified water is fit for industrial use. They are particularly advantageous, however, as flocculating agents in the paper industry. They are effective at a pH of between 7 and 3, or 6 and 4, as it results in aqueous suspensions of wood pulp for sheet formation because of the addition of aluminum sulfate.

Essentially, the present invention involves a process for the clarification of all acidic industrial waste waters, that is, waste waters with a pH of below 7, either together with a primary water-soluble inorganic coagulant, such as alum (aluminum sulfate), or in its absence. The oxyaminated polyacrylamides in essence are organic polyelectrolyte coagulants which are effective in acidic waters to form flocculation centers for the flocculation of primarily colloidal material suspended in the acidic industrial waste waters. The amount of oxyaminated polyacrylamide added to the acidic industrial waste waters for efficient flocculation depends on the amount of suspended solids contained therein. Usually the amounts employed are from 0.02 gm. to 2 gm. per 100 gm. of suspended solids or from 0.4 to 40 p.p.m. in the acidic industrial wastes. Flocculation is rapid and is usually complete in 1 to 30 minutes. Thereafter the floc is filtered or settled and the clarified water obtained.

The following examples are illustrative of the practice of the invention without being limitative in any manner.

EXAMPLES

Preparation of the starting materials 30 gm. of acrylamide were dissolved in 170 ml. of dionized water and freed of oxygen by agitation for 20 minutes in a strong stream of nitrogen. Then 3 mg. of sodiuum sulfite and 5 mg. of potassium peroxydisulfate, dissolved in a little water, were added and after adjusting the pH of the reaction solution to 6.5 with sodium hydroxide, it was heated to 35° C. After 4 hours of polymerization at 35° C., the polymer solution, which has a monomer content of 3% to 5%, could be reacted directly with the aminoalkylene oxides. The specific viscosity of 0.1% of the isolated material dissolved in a 1 N sodium nitrate solution was 2.3.

200 gm. of a 15% polyacrylamide solution were reacted with 0.6 gm. of 1-diethylamino-2,3-epoxypropane and 2.5 ml. of a 2 N sodium hydroxide solution. The reaction solution was stirred for 1 hour at 60° C. Subsequently, the reaction product was precipitated by the addition of ethanol, suction filtered and washed with ethanol. The specific viscosity of the isolated material, dissolved in a 1 N sodium nitrate solution, was 2.7.

In the same way the reaction with 1.2 gm. of 1-diethylamino-2,3-epoxypropane and with 0.65 gm. of 1-dibutylamino-2,3-epoxypropane was carried out. In a further charge the same amount of the polyacrylamide was reacted with 0.7 gm. of trimethylammonium-2,3-epoxypropane chloride.

These oxyaminated polyacrylamides had specific viscosities of 2.1, 2.3 and 2.4, respectively.

EXAMPLE 1

Flocculation of a pulp suspension

The effectiveness of the oxyaminated polyacrylamides, to be used according to the invention, was tested on wood pulp suspensions. For the determination of the water removal behavior from wood pulp suspensions, the following process was used. Dry fibrous material was distributed homogeneously in water and flowed with a constant flow rate on a filter cloth of known dimensions and porosity. The speed with which the water penetrates through the filter cloth is a measure for the water removal behavior. The filter cloth is appropriately placed in a cylindrical vessel which in its lower part has in different heights, two discharge openings. In a slow rate of water removal (rate of filtration), the large part of the liquid leaves through the lower opening. By the addition of flocculating agents the rate of water removal is increased and thus the part of the liquid which flows through the upper opening.

100 gm. of ground mechanical wood pulp were suspended in 5 liters of tap water and pulverized in an impact apparatus. One liter of the suspension thus obtained was diluted with 9 liters of water and adjusted to a pH of 6 or 4.3 with aluminum sulfate. One liter of the thus obtained pulp suspension was flocculated with the addition of 4 ml. of a 0.1% solution of the flocculation agent in water in the Schopper-Riegler apparatus.

The following Schopper-Riegler values (reduction of degree of fineness, leaflet V/7/61 of the Verein der Zellstoff und Papier-Chemiker und Ingenieure) were measured:

| Mol percent | Polyacrylamide oxyaminated with— | 1 pH of— 6 | 4.3 |
|---|---|---|---|
| 1 | 1-diethylamino-2,3-epoxypropane | −40 | −36 |
| 2 | do | −39 | −34 |
| 1 | 1-dibutylamino-2,3-epoxypropane | −37 | −29 |
| 1 | 1-trimethylammonium-2,3-epoxypropane chloride | −39 | −30 |
|  | Non-oxyaminated polyacrylamide (comparison test) | −20 | −0 |

EXAMPLE 2

Flocculation of a bentonite suspension 1.7 gm. of bentonite and 3.7 gm. of sodium chloride were added to 550 ml. of distilled water of 50° C. To this suspension each time 0.001 gm. of flocculating agent was added. The suspension was then poured into a pipe of 4 cm. diameter and 35 cm. height which was kept constantly at 50° C. by a heating jacket. The sedimentation speed in cm./sec. is given in the following as a measure for the flocculation effect:

| Mol percent | Polyacrylamide oxyaminated with— | Cm./sec. |
|---|---|---|
| 1 | 1-diethylamino-2,3-epoxypropane | 1.4 |
| 2 | do | 1.3 |
| 1 | Trimethylammonium-2,3-epoxypropane chloride | 1.3 |
|  | Non-oxyaminated polyacrylamide (comparison test) | 0.7 |

EXAMPLE 3

Flocculation of a pulp suspension

One liter samples of the pulp suspension described in Example 1 were adjusted to a pH of 6 or 4.3 by means of ferric sulfate.

Using polyacrylamides oxyaminated with diethylamino-2,3-epoxypropane, dibutylamino-2,3-epoxypropane and trimethylammonium-2,3-epoxypropane chloride as flocculation agents the same Schopper-Riegler values were obtained as in Example 1.

EXAMPLE 4

Flocculation of a pulp suspension

One liter samples of the pulp suspension of Example 1 were adjusted to a pH of 6 or 4.3 with hydrochloric acid. Using polyacrylamide or oxyaminated polyacrylamide as flocculation agents, the following Schopper-Riegler values were measured:

| Flocculation agent | pH of— | |
|---|---|---|
|  | 6 | 4.3 |
| Polyacrylamide (comparison test) | 0 | 0 |
| Polyacrylamide oxaminated with 1-diethyl-amino-2,3-epoxypropane | −4 | −3 |

EXAMPLE 5

Flocculation of a pre-clarified neutral paper mill waste water 0.002 gm. of polyacrylamide oxaminated with diethylamino-2,3-epoxypropane were added to one liter of the waste water at 25° C. The settling speed was measured at this temperature. It amounted to 1.3 centimeters per second.

When unmodified polyacrylamide was used as a flocculation agent in a comparative experiment, the settling speed amounted only to 0.5 centimeter per second.

EXAMPLE 6

Flocculation of a suspended matter containing natural river water

One liter samples of the river water were treated at 25° C. with 0.002 gm. of polyacrylamide or polyacrylamide oxaminated with 1-trimethylammonium-2,3-epoxypropane chloride. The settling speed measured as in Example 5 had the following values:

| Flocculation agent | pH | Cm./sec. |
|---|---|---|
| Polyacrylamide | 7 | 1.0 |
| Do | 5.3 | 0.9 |
| Oxyaminated polyacrylamide | 7 | 1.4 |
| Do | 5.3 | 1.3 |
| Do | 9 | 1.4 |

The preceding specific embodiments are illustrative of the practice of the invention. It is to be understood, however, that other expedients known to those skilled in the art may be employed without departing from the spirit of the invention or the scope of the appended claims.

We claim:
1. A process of clarification of aqueous suspensions consisting of contacting an aqueous suspension with an oxyaminated polyacrylamide in order to form a floc and separating clarified water from said floc.

2. The process of claim 1 wherein said aqueous suspensions are acidic industrial waste waters.

3. The process of claim 2 wherein said acidic industrial waste waters are aqueous acidic suspensions from the processing of paper.

4. The process of claim 1 wherein said oxyaminated polyacrylamide is added to said aqueous suspension in an amount of from 0.02 gm. to 2 gm. per 100 gm. of suspended material in said aqueous suspension.

5. The process of claim 1 wherein said oxyaminated polyacrylamide was prepared by the reaction of a polyacrylamide having an average molecular weight of from 2 to 10 million with from 0.2 to 20 mol percent based on the acrylamide unit in said polyacrylamide, of an organic epoxide containing groups selected from the group consisting of amine groups and quaternary ammonium groups.

6. The process of claim 1 wherein said oxyaminated polyacrylamide was prepared by the reaction of a polyacrylamide having an average molecular weight of from 2 to 10 million with from 0.5 to 2.5 mol percent, based on the acrylamide unit in said polyacrylamide, of an organic epoxide containing groups selected from the group consisting of amine groups and quaternary ammonium groups.

7. The process of claim 6 wherein said organic epoxide is a compound of the formulae

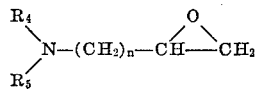

and

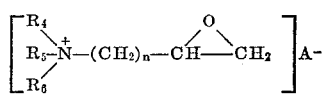

wherein $R_4$, $R_5$ and $R_6$ are alkyl having from 1 to 8 carbon atoms, $n$ is an integer from 1 to 4 and A represents a member selected from the group consisting of hydroxyl and the acyl of a strong mineral acid.

8. The process of claim 6 wherein said epoxide compound is a 1-di-lower-alkylamino-2,3-epoxypropane.

9. The process of claim 6 wherein said epoxide compound is a 1-tri-lower-alkylammonium-2,3-epoxypropane chloride.

10. The process of claim 1 wherein said aqueous suspension contains a primary water-soluble inorganic coagulant.

References Cited

UNITED STATES PATENTS

| 2,975,124 | 3/1961 | Caldwell et al. | 210—54 |
| 3,023,162 | 2/1962 | Fordyce et al. | 210—54 |
| 3,403,114 | 9/1968 | Vandenberg | 210—54 X |

MICHAEL ROGERS, Primary Examiner

U.S. Cl. X.R.

162—190; 210—54; 260—89.7